United States Patent [19]

Cole

[11] 4,042,158
[45] Aug. 16, 1977

[54] SPARE WHEEL CARRIER

[76] Inventor: Kenneth I. Cole, 10721 S. Plahm Court, Worth, Ill. 60482

[21] Appl. No.: 694,778

[22] Filed: June 10, 1976

[51] Int. Cl.² .......................................... B62D 43/04
[52] U.S. Cl. ............................ 224/42.23; 224/42.24; 211/23; 248/309 A
[58] Field of Search .............. 224/42.23, 42.24, 42.06, 224/29 R, 42.45 R, 42.1 R, 42.12, 42.21, 42.25, 42.38, 42.46 R, 42.05; 70/258, 259, 260; 211/23; 248/309 R, 309 A, 316 R, 326, 333, 295, 298

[56] References Cited

U.S. PATENT DOCUMENTS

| 1,492,288 | 4/1924 | Druar | 224/42.24 X |
| 3,724,731 | 4/1973 | Potgieter et al. | 224/42.23 |
| 3,843,033 | 10/1974 | Wirth | 224/42.24 |

FOREIGN PATENT DOCUMENTS

| 1,011,782 | 6/1952 | France | 224/42.24 |

Primary Examiner—Robert J. Spar
Assistant Examiner—Jerold M. Forsberg

[57] ABSTRACT

A spare wheel carrier of a type having telescoped relatively rotatable cylinders, one of which carries an arm to support a wheel thereon and which have complemental means to lock the arm in wheel supporting position which also functions to permit relative rotation of the two cylinders to release the wheel.

8 Claims, 9 Drawing Figures

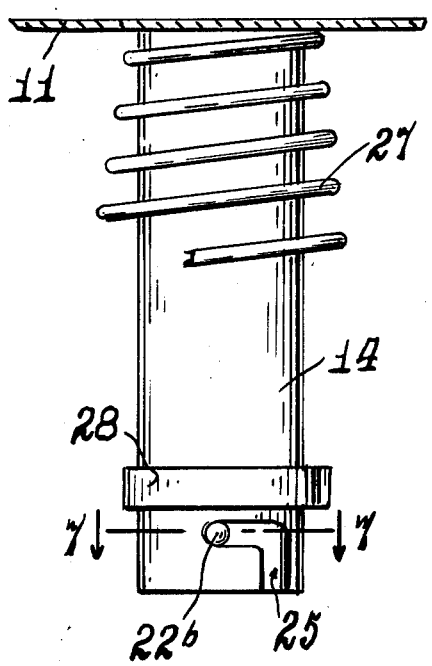
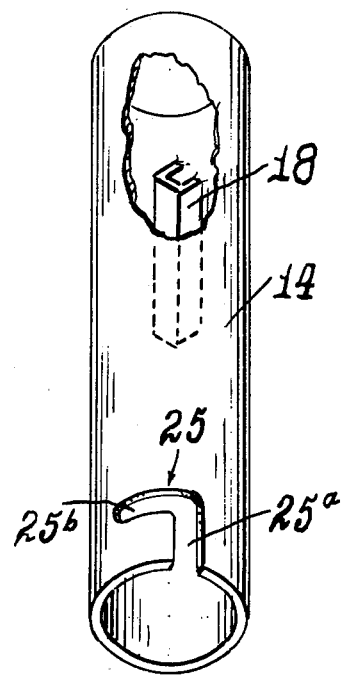
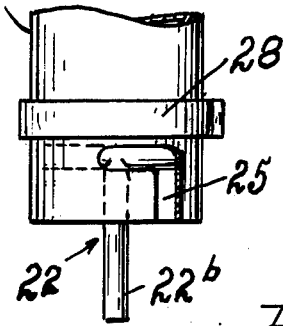
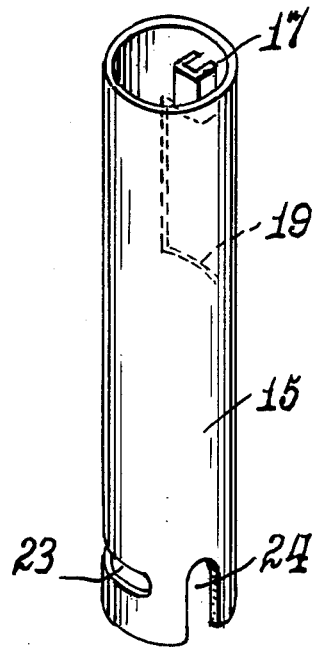
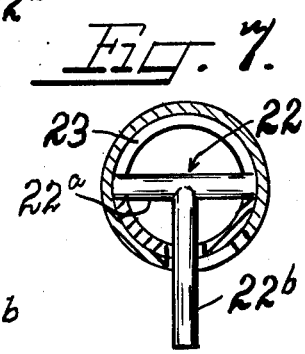
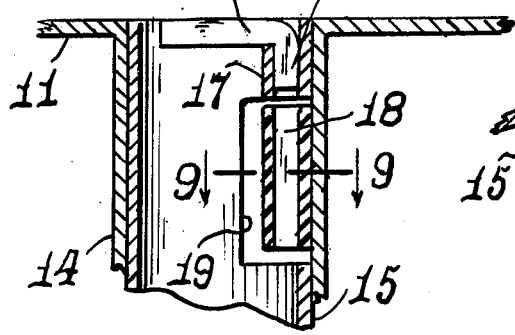
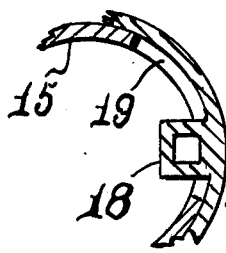

SPARE WHEEL CARRIER

The invention relates to spare wheel and tire carriers for vehicles and particularly for trucks, station wagons and like vehicles which embodies novel means for quick, easy mounting of the wheel-tire on the carrier and for easy removal from the carrier.

Known types of carriers of this general class employ a plurality of releasable latches or hooks (U.S. Pat. No. 3,724,731); a complex carrier onto which the wheel-tire is placed (U.S. Pat. No. 3,698,609) and a beneath the floor rack (U.S. Pat. No. 3,883,118) upon which the wheel-tire is seated. In each of these prior devices the lock mechanism is exposed and each involves considerable manual effort, not only to mount the wheel-tire thereon but also to remove same therefrom. Because some wheel-tires are of considerable weight this is extremely disadvantageous because when a tire needs replacement it is frequently physically impossible for one man to remove the space wheel-tire from the rack or carrier.

The present invention is an improvement over these and other known patented structures by providing a carrier assembly on the underside of the vehicle, over which the spare wheel-tire assembly may be telescoped and subsequently locked against displacement by means manually operable from within the vehicle, which means functions also to release the wheel-tire in such fashion as to allow the wheel-tire to drop off of the stem without requiring manual effort. The assembly also includes means to prevent undue play between the mounted wheel-tire and the mounting assembly.

It is therefor an object of the invention to provide a wheel-tire carrier of the character referred to.

Another object is to provide a carrier of the character referred to with novel means to quickly and easily mount a wheel-tire thereon and to facilitate easy removal.

Another object is to provide a wheel-tire carrier with telescoped parts that are rotatable relative to each other for actuating the wheel-tire support means.

Another object is to provide a wheel-tire carrier with manually controlled means within the vehicle operable to lock a radial support arm in wheel-tire supporting position.

Another object is to provide a wheel-tire carrier with novel means to prevent undue vibration of the wheel-tire mounted thereon.

Another object is to provide a carrier of the character referred to which is not difficult or expensive to manufacture, that is easy to operate, and very efficient in use.

Other objects and advantages of the invention will become apparent with reference to the following description and accompanying drawings.

IN THE DRAWINGS

FIG. 3 is an elevational view of the carrier, showing the wheel support in wheel supporting position.

FIG. 4 is a fragmentary view similar to FIG. 3, showing the wheel support in non-supporting position.

FIG. 5 is a perspective view of the outer cylinder of the carrier assembly.

FIG. 6 is a perspective view of the inner cylinder of the carrier assembly.

FIG. 7 is a horizontal sectional view taken substantially on line 7—7 of FIG. 3.

FIG. 8 is an enlarged central sectional view of the upper portion of the carrier, showing the assembly unlocked and conditioned for manipulation.

FIG. 9 is a detail view taken on line 9—9 of FIG. 8.

Figure 1:
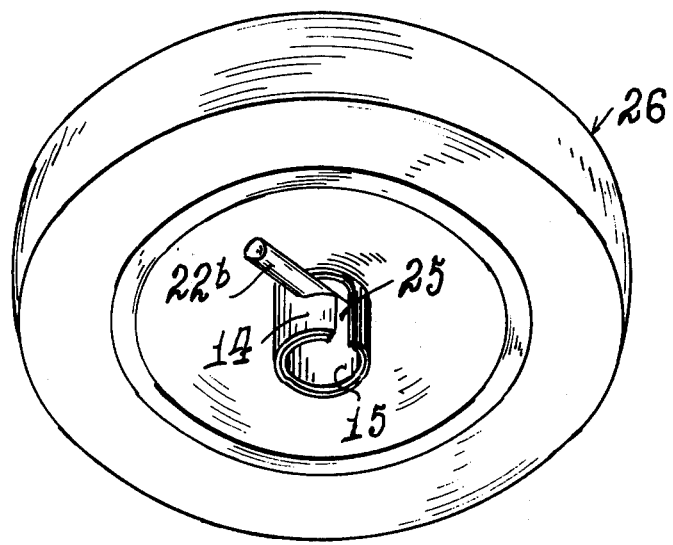
FIG. 1 is a perspective view of the wheel carrier having a wheel-tire mounted thereon.
Figure 2:
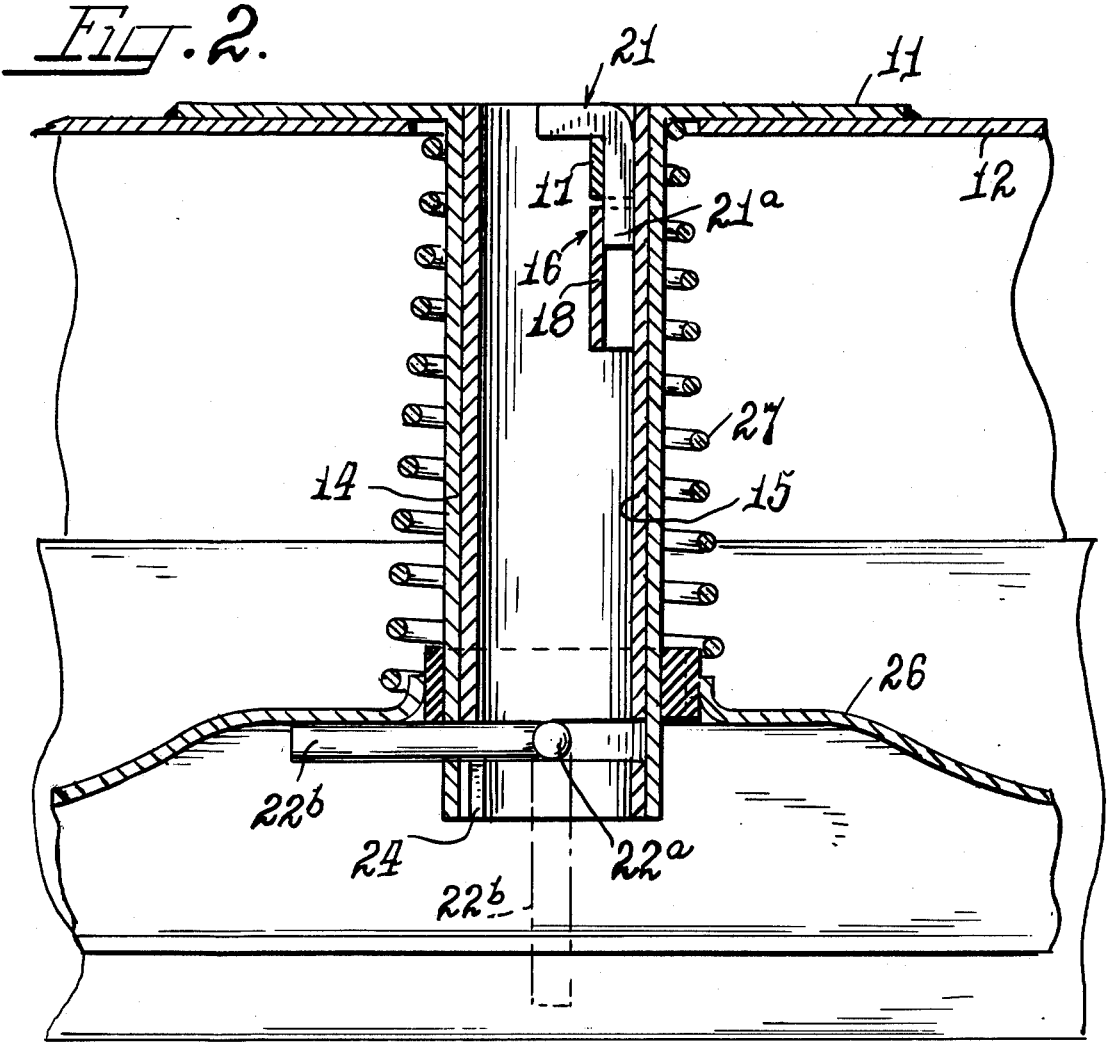
FIG. 2 is an enlarged vertical sectional view of the carrier and wheel, showing the assembly locked.

Referring to the exemplary disclosure of the carrier shown in the accompanying drawings, and particularly to FIGS. 1 and 2, the carrier includes a mounting plate 11 which affords means to support the carrier on the top side of the vehicle floor 12, either with bolts or by welding. The floor 12 will have a circular opening therein for the purpose of allowing the carrier to depend therethrough.

Integral with and depending from plate 11 is an outer cylinder 14 of requisite length within which is telescoped a concentric inner cylinder or tube 15. The inner cylinder or tube 15 is rotatable relative to the outer cylinder or tube 14 and, to this end, the two tubes have complemental tool engageable means generally indicated at 16.

Specifically, the inner cylinder 15 has, integral with its inside surface at its upper end, a non-circular tubular element 17, whereas the outer cylinder 14 has, on its inside surface adjacent to its upper end, a non-circular tubular element 18 that extends freely through a substantially rectangular opening 19 in the inner cylinder so as to be out of axial alignment normally with element 17.

The function and operation of the carrier so far as described is such that when a tool, such as the allen wrench 21 shown has its long leg 21a fitted into the aligned elements 17-18, as shown in FIG. 2, the two cylinders are locked against relative rotation. When the short leg 21b of the tool is fitted into the element 17 only, as in FIG. 8, the tool can be used to rotate the inner cylinder relative to the outer cylinder.

As best shown in FIGS. 2, 3, 4 and 7, the lower end of the inner cylinder 15 mounts a T-shaped member 22 including pivotal leg 22a and radial arm 22b. The leg 22a is of a length to respond to the outside diameter of the inner cylinder and it is seated in a circumferential slot 23 so that its arm 22b may be swung upwardly into an open ended slot 24. The outer cylinder 14 has adjacent to its lower end a bayonet slot 25 which, when in register with the slot 24, permits the arm 22b to swing down into a substantially vertical position axially of the cylinders as best shown in FIG. 4. It is in this position when a wheel-tire 26 is to be fitted over the carrier or removed therefrom.

Referring specifically to FIG. 2, it will be observed that the central axial opening in the wheel 26 is fitted over the outer cylinder. As it is lifted upwardly thereover it compresses an external coil spring 27, surrounding the said cylinder, until its margin surrounding its axial opening is seated on a resiliently yieldable collar 28 carried on the lower end of said outer cylinder. The collar 28 and spring 27 function to avoid a sloppy fit of the wheel on the carrier when the former is locked in place thereon in the manner now to be described.

To lock the wheel on the carrier, the arm 22b is raised into a horizontal position into the vertical leg 25a of bayonet slot 25 whereupon the short leg 21b of the allen wrench 21 or other tool is fitted into the inner cylinder element 17 (FIG. 8) and used as a lever to rotate cylinder. This rotation carries the radial arm 22b into the horizontal portion 25b of the bayonet slot (FIG. 1 and 3). At this point of time the two elements 17 and 18 are in registering alignment whereupon the short leg of the allen wrench is withdrawn from the element 17 and its long leg 21a is thrust into the aligned elements (FIG. 2) to prevent rotation of the inner cylinder.

The wheel rests on the arm 22b and cannot be removed until the long wrench leg 21a is withdrawn and the inner cylinder rotated back to its initial position.

It should be evident that applicant has provided a spare wheel mount that requires but minimum effort to release the wheel therefrom and one that secures the wheel firmly so as to avoid undue noises resulting from vibration.

Although I have described a preferred embodiment of the invention, in considerable detail, it will be understood that the description thereof is intended to be illustrative rather than restrictive, as details of the structure may be modified or changed without departing from the spirit or scope of the invention. Accordingly, I do not desire to be restricted to the exact construction shown and described.

I claim:

1. A spare tire and wheel carrier for vehicles including a plate that is mounted securely in a suitable position proximate the underside of a vehicle body, a cylinder rigidly secured at its upper end to said plate, said cylinder extending downwardly from said plate and having a bayonet slot in its wall opening onto the bottom end thereof, an inner cylinder within said outer cylinder and rotatable relative to said outer cylinder between a first position and a second position, an arm pivotally connected to said inner cylinder adapted when the inner cylinder is in said first position relative to the outer cylinder to hang downwardly vertically and when the inner cylinder is in said second position relative to the outer cylinder to lie horizontally and project through the bayonet slot, and means on the inner cylinder to facilitate rotation of said inner cylinder between said first and second positions, whereby a wheel, when telescoped onto the outer cylinder, is retained thereon by the arm when it is in its horizontal position.

2. The carrier recited in claim 1, wherein a compression spring surrounds the outer cylinder for compression by the wheel mounted on said outer cylinder.

3. The carrier recited in claim 1, wherein an external resiliently yieldable collar is provided adjacent the lower end of the outer cylinder to cushion the mounted wheel.

4. The carrier recited in claim 1, wherein the arm constitutes the leg of a T-shaped fitting having its head portion journalled in opposed walls of the inner cylinder.

5. The carrier recited in claim 1, wherein the cylinders have complemental means engageable by a tool to prevent rotation of the inner cylinder.

6. The carrier recited in claim 5, wherein the complemental means on the inner cylinder is engageable by a tool to rotate the inner cylinder.

7. The carrier recited in claim 5, wherein the inner cylinder has a cut-out area to receive the complemental means on the outer cylinder.

8. The carrier recited in claim 5, wherein each of the complemental means comprises a non-circular tubular element.

* * * * *